（12) United States Patent
Sharma (10) Patent No.: US 12,444,423 B2
(45) Date of Patent: Oct. 14, 2025

(54) SYSTEM AND METHOD FOR SINGLE CHANNEL DISTANT SPEECH PROCESSING

(71) Applicant: Microsoft Technology Licensing, LLC, Redmond, WA (US)

(72) Inventor: Dushyant Sharma, Mountain House, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 17/974,674

(22) Filed: Oct. 27, 2022

(65) Prior Publication Data

US 2024/0144936 A1 May 2, 2024

(51) Int. Cl.
*G10L 17/20* (2013.01)
*G10L 17/02* (2013.01)
*G10L 21/028* (2013.01)
*H04S 3/00* (2006.01)

(52) U.S. Cl.
CPC .............. *G10L 17/20* (2013.01); *G10L 17/02* (2013.01); *G10L 21/028* (2013.01); *H04S 3/008* (2013.01); *H04S 2400/01* (2013.01); *H04S 2400/15* (2013.01)

(58) Field of Classification Search
CPC ....... G10L 17/20; G10L 17/02; G10L 21/028; H04S 3/008; H04S 2400/01; H04S 2400/15
See application file for complete search history.

(56) References Cited

U.S. PATENT DOCUMENTS

| 10,885,902 | B1 | 1/2021 | Papania-Davis |
| 12,087,319 | B1* | 9/2024 | Looney ................. G06N 3/048 |
| 2014/0278397 | A1* | 9/2014 | Chen ....................... G10L 21/02 |
| | | | 704/233 |
| 2016/0098987 | A1 | 4/2016 | Stolcke |
| 2017/0278527 | A1* | 9/2017 | Sharma ................. G10L 15/063 |
| 2021/0035551 | A1 | 2/2021 | Stanton |
| 2021/0335337 | A1 | 10/2021 | Gkoulalas-Divanis |
| 2021/0350815 | A1* | 11/2021 | Sharma ................... G10L 25/78 |
| 2022/0399026 | A1 | 12/2022 | Gong et al. |

(Continued)

FOREIGN PATENT DOCUMENTS

| CN | 107071636 A * | 8/2017 | ............... G01H 7/00 |
| WO | WO-2021119102 A1 * | 6/2021 | ............. G10L 25/81 |

(Continued)

OTHER PUBLICATIONS

Gong, et al., "Self-Attention Channel Combinator Frontend for End-to-End Multichannel Far-field Speech Recognition", In Repository of arXiv:2109.04783v1, Sep. 10, 2021, 5 Pages.

(Continued)

*Primary Examiner* — Anne L Thomas-Homescu
(74) *Attorney, Agent, or Firm* — Foley IP Law, PLLC (57) ABSTRACT

A method, computer program product, and computing system for receiving a signal from a single microphone. A plurality of modified signals may be generated from the single microphone signal, where the plurality of modified signals include at least one of: a speaker-specific signal, an acoustic parameter-specific signal, and a speech enhanced signal. Speech processing may be performed on the plurality of modified signals.

19 Claims, 4 Drawing Sheets

(56) References Cited

U.S. PATENT DOCUMENTS

| | | | |
|---|---|---|---|
| 2023/0267944 A1* | 8/2023 | Dushyant | G10L 25/84 704/233 |
| 2023/0410789 A1* | 12/2023 | Sharma | G10L 13/033 |
| 2023/0410814 A1 | 12/2023 | Yin | |
| 2024/0296826 A1 | 9/2024 | Sharma | |

FOREIGN PATENT DOCUMENTS

| | | | | |
|---|---|---|---|---|
| WO | WO-2021183657 A1 * | 9/2021 | | H04S 7/30 |
| WO | WO-2023177095 A1 * | 9/2023 | | G10L 15/20 |

OTHER PUBLICATIONS

Pascual, et al., "Learning Problem-agnostic Speech Representations from Multiple Self-supervised Tasks", In Repository of arXiv:1904.03416v1, Apr. 6, 2019, 5 Pages.

International Search Report and Written Opinion received for PCT Application No. PCT/US23/034600, Mar. 14, 2024, 21 pages.

U.S. Appl. No. 18/318,185, filed May 16, 2023.

International Search Report and Written Opinion received for PCT Application No. PCT/US2024/017370, (MS#412809-PCT01) May 6, 2024, 12 pages.

Shahin-Shamsabadi, et al., "Differentially private speaker anonymization." arXiv:2202.11823, Feb. 23, 2022, pp. 1-17.

Grais et al., "Deep neural networks for single channel source separation," IEEE International Conference on Acoustics, Speech and Signal Processing (ICASSP), pp. 3734-3738, May 4, 2014.

Grais et al., "Single-Channel Audio Source Separation Using Deep Neural Network Ensembles," AES Convention 140, 7 Pages, May 26, 2016.

Invitation to Pay Additional Fees received for PCT Application No. PCT/US2023/034600, mailed on Jan. 22, 2024, 14 pages.

International Preliminary Report on Patentability (Chapter 1) received for PCT Application No. PCT/US2023/034600, May 8, 2025, 14 pages.

Non-Final Office Action mailed on Jul. 16, 2025, in U.S. Appl. No. 18/318,185, 45 pages.

* cited by examiner

SYSTEM AND METHOD FOR SINGLE CHANNEL DISTANT SPEECH PROCESSING

BACKGROUND

Speech processing systems (e.g., automatic speech recognition (ASR) systems, biometric voice systems, etc.) suffer recognition accuracy degradation from the input of a far-field speech signal when the speakers are distant from the microphone. The degradation may be due to the signal corruption effect of the far-field speech caused by room reverberation and the background noise. Compared with a single microphone, a microphone array device, which comprises multiple microphones, can be used to capture multi-channel audio signal as the input to a speech processing backend system (e.g., an ASR backend system) for alleviating such a degradation problem. However, when only a single microphone channel is available, speech processing of a single microphone signal is less accurate or robust against noise or other non-speech acoustic properties than that of a microphone array.

BRIEF DESCRIPTION OF THE DRAWINGS

Like reference symbols in the various drawings indicate like elements.

DETAILED DESCRIPTION OF THE PREFERRED EMBODIMENTS

As discussed above, speech processing systems are subject to recognition accuracy degradation from the input of a far-field speech signal when the speakers are distant from the microphone. A microphone array device, which comprises multiple microphones, can be used to capture multichannel audio signals for alleviating degradation experienced by a single microphone. However, when only a single microphone channel is available, speech processing of a single microphone signal is less accurate or robust against noise or other non-speech acoustic properties than that of a microphone array. Further, many conventional speech processing systems are configured to process only a single speech channel.

As will be discussed in greater detail below, implementations of the present disclosure provide a technical solution necessarily rooted in computing technology to provide enhanced speech processing for single microphone systems by generating a multi-microphone representation of a single microphone channel. Specifically, implementations of the present disclosure generates multiple microphone signals from a single microphone channel and then either combine the plurality of microphone signals to generate a combined speech signal that includes signal properties of the multiple microphone signals, or to provide the microphone signals to a multichannel speech processing system. In this manner, implementations of the present disclosure may improve conventional speech processing systems configured to process single channel microphone signals in a manner similar to multichannel speech processing systems.

The details of one or more implementations are set forth in the accompanying drawings and the description below. Other features and advantages will become apparent from the description, the drawings, and the claims.

The Single Channel Speech Enhancement Process:

In the context of a single microphone device being used for the acquisition of audio data for a speech processing system (such as ASR), there are several challenges. One of the biggest challenges stems from the fact that it is not possible to combine information from sampling the acoustic space as is done with multiple microphone systems. This is especially important for far-field or mid-field audio capture (such as when a tablet is on a table) where conventional approaches for ASR use multichannel end to end front ends to improve system performance. Current approaches for single channel systems apply some speech enhancement or de-reverberation algorithms and rely on this enhanced signal for performing ASR. Another approach commonly used is of data augmentation. However, whenever such enhancement is performed, some artifacts are usually introduced, and it is also not clear what the trade-off is between trying to learn from the degraded original data (e.g., via data augmentation) or from the enhanced signals (e.g., via imperfect reduction of artifacts). Implementations of the present disclosure provide a speech processing front end that allows a multichannel speech processing system to be exploited with a single microphone channel. Single channel speech enhancement process 10 processes the single channel signal in multiple ways and then either combine them with the original signal, or provide the multiple signals to a multi-channel speech processing system. This ensures that no information is ever lost (due to the speech enhancement process for example) as the original unprocessed signal is always available.

Referring to FIGS. 1-4, single channel speech enhancement process 10 receives 100 a signal from a single microphone. A plurality of modified signals are generated 102 from the single microphone signal, where the plurality of modified signals include at least one of: a speaker-specific signal, an acoustic parameter-specific signal, and a speech enhanced signal. Speech processing is performed 104 on the plurality of modified speech signals.

Figure 1:
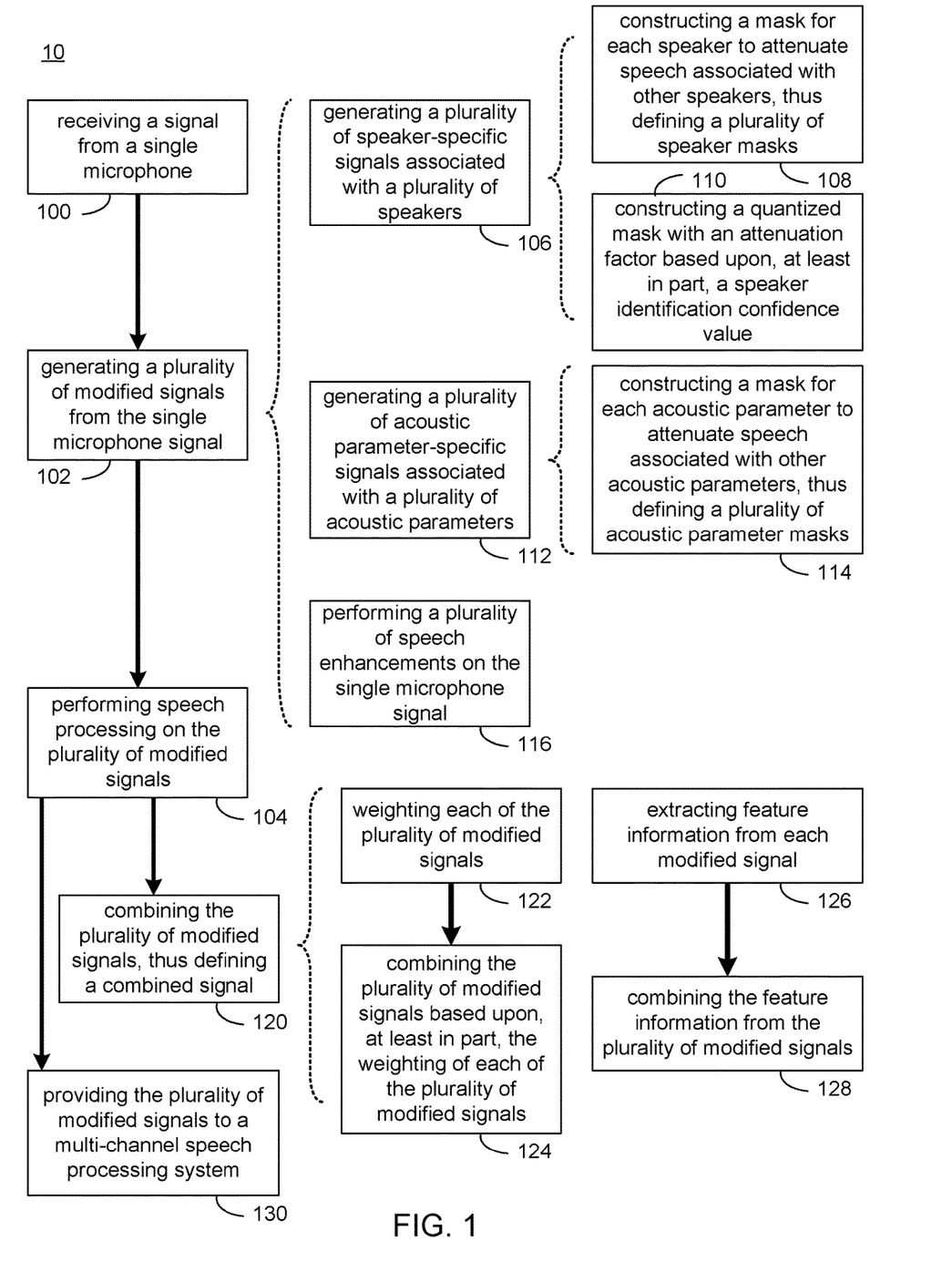
FIG. 1 is a flow chart of one implementation of the single channel speech enhancement process of FIG. 1.
Figure 2:
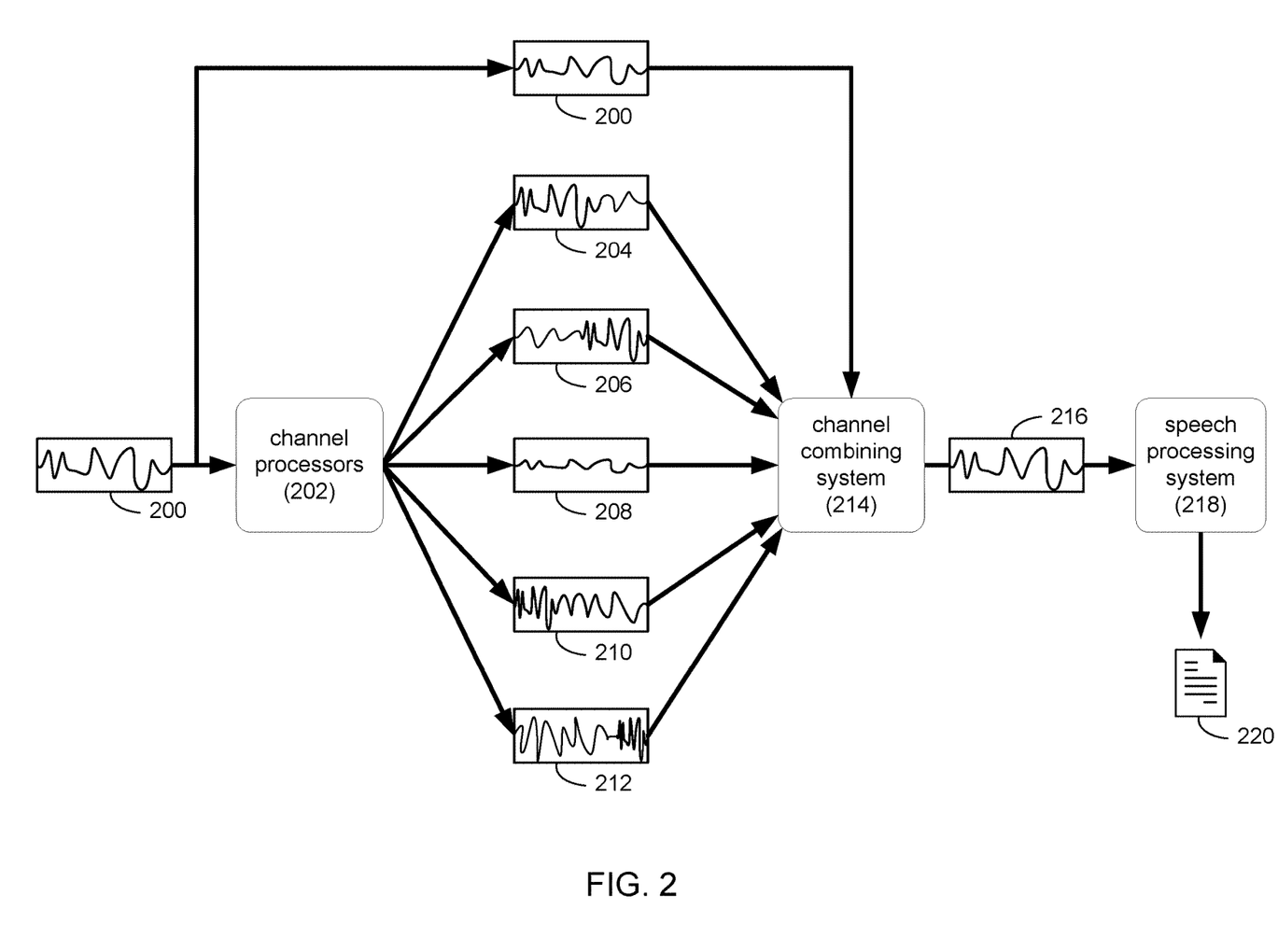
FIG. 2 is a diagrammatic view of the single channel speech enhancement process of FIG. 1.

In some implementations, single channel speech enhancement process 10 receives 100 a signal from a single microphone or other audio acquisition device. For example and as discussed above, an audio recording system receives and records an input speech signal. Referring also to FIG. 2, single channel speech enhancement process 10 receives an input speech signal (e.g., speech signal 200). In one example, speech signal 200 is received and recorded by an audio recording system and/or may be a previously recorded audio input signal (e.g., an audio signal stored in a database or other data structure). In one example, suppose that speech signal 200 concerns a medical encounter between a medical professional and a patient. In this example, the patient may be asked by the medical professional to audibly confirm personal identification information (e.g., name, date of birth, marital status, etc.) during a medical examination. Additionally, the patient may describe personal health information (e.g., symptoms, medical history, etc.). As will be discussed in greater detail below, single channel speech enhancement process 10 processes the input speech signal to generate a transcription and/or to populate medical records automatically.

In some implementations, single channel speech enhancement process 10 generates 102 a plurality of modified signals from the single microphone signal. For example and as discussed above, conventional approaches that use a microphone array allow speech processing systems to exploit acoustic properties from multiple speech signals. However, with a single microphone channel, performing data augmentation or speech enhancements on the signal result in a degraded speech signal or a signal with an imperfect reduction of artifacts. For example and as shown in FIG. 2, single channel speech enhancement process 10 uses speech signal 200 and one or more channel processors (e.g., represented in FIG. 2 as channel processor 202) to generate a plurality of modified speech signals (e.g., modified speech signals 204, 206, 208, 210, 212) from the single microphone signal (e.g., speech signal 200).

In some implementations, generating 102 the plurality of modified signals includes generating 106 a plurality of speaker-specific signals associated with a plurality of speakers. For example, single channel speech enhancement process 10 uses a speaker diarization system to segment speech signal 200 into a plurality of segments or signals based upon each distinct speaker detected in each segment of the speech signal. A speaker diarization system is a speech processing system configured to partition an input audio stream into homogeneous segments according to the speaker identity. In one example, suppose a speaker diarization system processes speech signal 200 and generates e.g., two streams or segments for e.g., two discrete speakers. Accordingly, single channel speech enhancement process 10 generates 106 modified signals 204, 206 where modified signal 204 includes the segments associated with a first speaker while modified signal 206 includes the segments associated with a second speaker. In this example, the speaker diarization system may not know the identity of each speaker but may recognize the acoustic properties of speech signals unique to each speaker.

In another example, single channel speech enhancement process 10 uses a speaker verification system to segment the audio (e.g., speech signal 200) into a plurality of speaker-specific signals or segments (e.g., modified speech signals 204, 206). In this example, the speaker verification system has access to the voiceprint of each encounter participant. For example, single channel speech enhancement process 10 accesses a database or other source of voiceprints associated with a plurality of known speakers. Accordingly, single channel speech enhancement process 10 uses channel processor 202 (e.g., a speaker verification system) to determine the identify of each speaker in speech signal 200 and to generate modified speech signal 204 with the speech portions associated with a doctor and modified speech signal 206 with the speech portions associated with a patient. In this manner, modified speech signal 204 includes speech segments associated with a doctor and modified speech signal 206 includes speech portions associated with a patient.

In some implementations, generating 106 the plurality of speaker-specific signals associated with the plurality of speakers includes constructing 108 a mask for each speaker to attenuate speech associated with other speakers, thus defining a plurality of speaker masks. For example, single channel speech enhancement process 10 construct masks based on the identity of each speaker. Constructing 108 a mask or masking the speech signal to generate a plurality of modified speech signals includes applying weights to the speech signal to enhance, diminish, or isolate portions of audio. For example, suppose a speaker verification system is used to segment the audio into e.g., doctor and patient segments, single channel speech enhancement process 10 constructs 108 e.g., two new channels by applying a mask (e.g., in the time domain) to speech signal 200. In some implementations, when generating modified speech signal 204 for speech associated with a doctor, single channel speech enhancement process 10 uses the mask to attenuate the speech belonging to the other speaker. Similarly, when generating modified speech signal 206 for speech associated with a patient, single channel speech enhancement process 10 uses the mask to attenuate the speech belonging to the other speaker.

In some implementations, constructing 108 the mask for each speaker includes constructing a binary mask for each speaker. With a binary mask, the mask has a value of either "1" or "0" for each time sample and are multiplied by the microphone signal (e.g., speech signal 200) to generate modified speech signals 204, 206. In this manner, taking the two-speaker example from above, each channel constructed using these masks will have mutually exclusive content.

In some implementations, constructing 108 the mask for each speaker includes constructing 110 a quantized mask based upon, at least in part, a speaker identification confidence value. With a quantized mask, the masks have a real number value in the range from e.g., "0" to "1" generated from a speaker identification confidence value. These weights are derived from a speaker identification confidence value taken from the speaker diarization or verification system (i.e., when the speaker verification system or diarization system are very certain that the segment belongs to e.g., the doctor, the mask is constructed with a weight close to "1" for the doctor channel (e.g., modified speech signal 204)). Similarly, single channel speech enhancement process 10 constructs 110 a quantized mask for the patient's modified speech signal based upon, at least in part, the speaker identification confidence value for speech signals associated with the patient.

In some implementations, generating 102 the plurality of modified signals includes generating 112 a plurality of acoustic parameter-specific signals associated with a plurality of acoustic parameters. For example, single channel speech enhancement process 10 uses a Non-Intrusive Speech Assessment (NISA) system to identify acoustic parameters or properties from an input speech signal. A NISA system is a multi-task machine learning framework for non-intrusive acoustic parameter estimation that includes voice activity detection (VAD), C50 (i.e., the ratio of the early sound energy (between 0 and 50 milliseconds) and the late sound energy (that arrives later than 50 milliseconds) in a room impulse response (RIR)), Perceptual Evaluation of Speech Quality (PESQ), and segmental SNR which is able to reliably estimate a number of parameters in short windows of length 300 milliseconds using the multi-task training paradigm. While an example of a NISA system has been described for identifying acoustic parameters from the speech signal, various known methodologies may be used to identify the plurality of acoustic parameters associated with speech signal within the scope of the present disclosure.

In some implementations, single channel speech enhancement process 10 segments audio from the speech signal into a plurality of modified speech signals based upon, at least in part, the plurality of acoustic parameters identified from speech signal 200. For example, single channel speech enhancement process 10 identifies portions of speech signal 200 with particular noise-based and/or reverberation-based acoustic parameters. In one example, single channel speech enhancement process 10 generates 112 modified signal 208 to include segments of speech signal 200 with e.g., a signal-to-noise ratio (SNR) greater than a predefined value and modified speech signal 210 to include segments of speech signal 200 with e.g., a SNR less than or equal to the predefined value. In another example, single channel speech enhancement process 10 generates 112 modified speech signal 208 to include segments of speech signal 200 with e.g., a C50 value greater than a predefined value (e.g., 10 dB) and modified speech signal 210 to include segments of speech signal 200 with e.g., a C50 less than or equal to the predefined value (e.g., 10 dB). In this manner, single channel speech enhancement process 10 generates 112 a plurality of acoustic parameter-specific signals associated with a plurality of acoustic parameters.

In some implementations, generating 112 the plurality of acoustic parameter-specific signals associated with the plurality of acoustic parameters includes constructing 114 a mask for each acoustic parameter to attenuate speech associated with other acoustic parameters, thus defining a plurality of acoustic parameter masks. For example and as discussed above, single channel speech enhancement process 10 constructs masks to selectively attenuate segments or portions of speech signal 200 that do not include particular acoustic parameters. Continuing with the above example, single channel speech enhancement process 10 constructs 114 a mask to generate 102 modified speech signal 208 to include segments of speech signal 200 with e.g., a C50 value greater than a predefined value (e.g., 10 dB) by "masking" segments of speech signal 200 with e.g., a C50 less than or equal to the predefined value (e.g., 10 dB). Similarly, single channel speech enhancement process 10 constructs 116 a mask to generate 118 modified speech signal 210 to include segments of speech signal 200 with e.g., a C50 value less than or equal to the predefined value (e.g., 10 dB) by "masking" segments of speech signal 200 with e.g., a C50 greater than the predefined value (e.g., 10 dB).

As discussed above, each acoustic parameter mask is binary or quantized. For example, single channel speech enhancement process 10 constructs each acoustic parameter mask based upon, at least in part, a confidence value associated with the identification of particular acoustic parameters (e.g., a confidence value for the identification of each acoustic parameter as defined by the NISA system). In this manner, single channel speech enhancement process 10 accounts for variable or dynamic confidence in the identification of acoustic parameters when constructing acoustic parameters masks for particular acoustic parameters.

In some implementations, single channel speech enhancement process 10 generate 112 the plurality of acoustic parameter-specific signals associated with the plurality of acoustic parameters by extracting an acoustic embedding from the speech signal (e.g., speech signal 200). An acoustic embedding is a vector or other data structure that represents various background acoustics measured over one or more short time frames. An acoustic embedding is extracted that represents background acoustics for a particular frame or segment of input speech signal 200. The acoustic embedding is generated by isolating the speech content from input speech signal 200 and representing the remaining signal as a vector or other data structure. In one example, a Non-Intrusive Speech Assessment (NISA) system is used to extract acoustic embedding 208 from input speech signal 200.

For example and instead of, or in addition to, extracting particular acoustic parameters from the input speech signal, single channel speech enhancement process 10 uses a NISA system to extract an acoustic embedding with entries or properties such as reverberation time (i.e., the time in seconds required for the level of the sound to drop 60 dB after the sound source is turned off); C50 (i.e., speech clarity measured as the ratio of the early sound energy (between 0 and 50 milliseconds) and the late sound energy (that arrives later than 50 milliseconds)); signal-to-noise ratio (SNR); a bit rate; gain (i.e., sound strength); etc. measured over short time frames or segments. For example, the length or duration of each frame or segment is predefined and/or user-defined.

Figure 3:
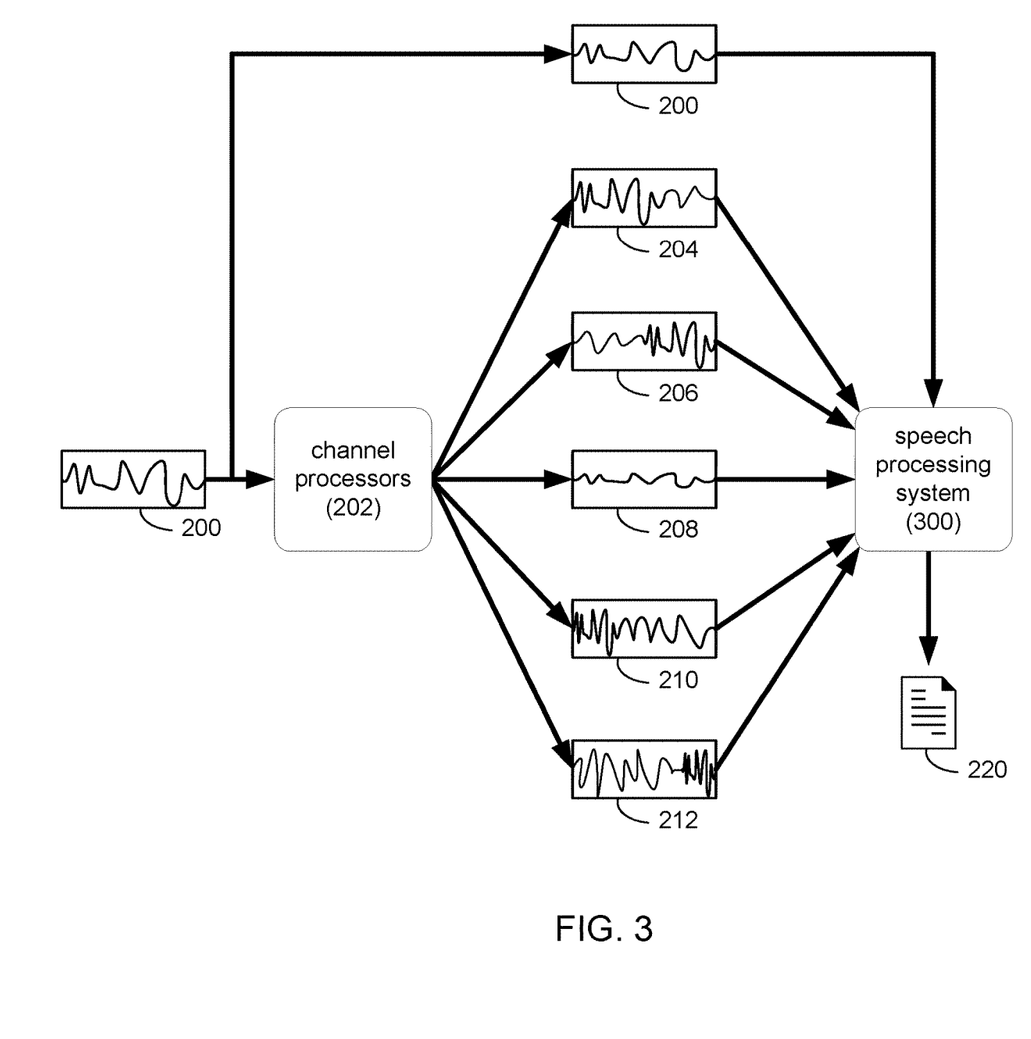
FIG. 3 is a diagrammatic view of the single channel enhancement process of FIG. 1 utilizing a multi-channel speech processing system.

In some implementations, single channel speech enhancement process 10 constructs the plurality of acoustic parameter-based masks based upon, at least in part, extracting an acoustic embedding from the speech signal. For example, single channel speech enhancement process 10 constructs the plurality of acoustic parameter-based masks based on the acoustic embedding by clustering the acoustic embedding and generating masks for each acoustic parameter. For example and as shown in FIG. 3 and as described above, suppose a doctor has a microphone (e.g., a mobile device) in their shirt pocket and a patient is seated e.g., 1.5 meters away from the doctor (i.e. much further away from the microphone). In this example, suppose that a NISA system is used to extract neural acoustic embeddings on a per-segment basis (e.g., every 20 milliseconds). Single channel speech enhancement process 10 clusters the extracted acoustic embeddings (e.g., using k-means with two centroids) to yield two clusters: one belonging to the doctor and the other to the patient, where the clusters are separated due to differences in e.g., reverberation. Single channel speech enhancement process 10 constructs a mask for each encounter participant in a similar way as described above, but instead of a threshold on a parameter, "membership" within a cluster is used as the deciding variable.

In some implementations, generating 102 the plurality of modified signals includes performing 116 a plurality of speech enhancements on the single microphone signal. For example, single channel speech enhancement process 10 performs 116 noise reduction enhancements, de-reverberation enhancement, and/or gain/signal level enhancements. In one example, single channel speech enhancement process 10 generates 102 modified speech signal 212 by performing noise reduction on speech signal 200. Performing 116 noise reduction is achieved using any method or system known in the art. In another example, single channel speech enhancement process 10 generates 102 modified speech signal 212 by performing de-reverberation on speech signal 200. In another example, single channel speech enhancement process 10 generates 102 modified speech signal 212 by performing automatic gain control or signal level enhancements on speech signal 200. Performing 116 automatic gain control or signal level enhancements is achieved using any method or system known in the art.

In some implementations, single channel speech enhancement process 10 performs 104 speech processing on the plurality of modified signals. For example and as discussed above, single channel speech enhancement process 10 exploits the above-described "front end" (i.e., channel processors 202) for single microphone channel data by providing as input the single microphone channel to generate a number of modified single channel signals. These modified speech signals include various signal enhancements or modifications (e.g., channel shortening, WPE, noise reduction, etc.). This approach allows the speech processing system (e.g. speech processing system 218) to learn to use different types of information without losing anything (i.e., in a traditional single channel system, one would feed in enhanced signals only and if the enhancement fails on some segments of the audio, then there will be an overall loss). By contrast, with single channel speech enhancement process 10, there is always the original speech signal to use or fall back on if there is an enhancement fail. With the combined speech signal (e.g., combined speech signal 216), speech processing system 218 generates a transcription (e.g., transcription 220) of combined speech signal 216 and/or populates medical records or other records using the content of combined speech signal 216.

In some implementations, performing 104 speech processing on the plurality of modified signals includes combining 120 the plurality of modified signals, thus defining a combined signal. As discussed above, conventional microphone arrays are able to exploit multi-channel speech processing features and properties across multiple signals to enhance distant speech processing. Single channel speech enhancement process 10 uses the plurality of modified signals to enhance the properties of the original speech signal without losing the original speech signal. Many end-to-end speech processing systems (e.g., end-to-end ASR) are configured as back-end systems (e.g., deployed on a server) to process a single speech signal. As opposed to providing only the original speech signal (as in conventional approaches), single channel speech enhancement process 10 combines 120 the plurality of modified signals, including the original speech signal, to generate a combined signal. For example and as shown in FIG. 2, single channel speech enhancement process 10 provides each of the plurality of modified speech signals (e.g., modified speech signals 204, 206, 208, 210, 212) and the original speech signal (e.g., speech signal 200) to one or more channel combining system (e.g., channel combining system 214). As will be discussed in greater detail below, a channel combining system is a software and/or hardware component or system configured to combine multi-channel input into a single channel representation of the multi-channel input.

In some implementations, combining 120 the plurality of modified signals, thus defining a combined signal includes weighting 122 each of the plurality of modified signals; and combining 126 the plurality of modified signals based upon, at least in part, the weighting of each of the plurality of modified signals. For example, channel combining system 214 includes a weighting system configured to apply particular weights to each modified speech signal. In one example, channel combining system includes a neural network or other machine learning system configured to receive the plurality of modified signals (e.g., modified speech signals 204, 206, 208, 210, 212) and the original speech signal (e.g., speech signal 200) as inputs and apply weights to each of the modified speech signals to generate a single channel representation of the plurality of weighted modified speech signals. In this manner, the single channel representation (e.g., combined signal 216) is generated as a weighted sum of the plurality of modified speech signals (e.g., modified speech signals 204, 206, 208, 210, 212) and the original speech signal (e.g., speech signal 200).

In some implementations, combining 120 the plurality of modified signals includes combining 124 the plurality of modified signals using a self-attention machine learning model. For example, channel combining system 214 includes a self-attention machine learning model as described in pending U.S. application Ser. No. 17/539,451 filed on Dec. 1, 2021 entitled "System and Method for Self-attention-based Combining of Multichannel Signals for Speech Processing", the entirety of which is incorporated by reference. However, it will be appreciated that any machine learning model can be used within the scope of the present disclosure. For example, a recurrent neural network or self-attention machine learning model can be used. Self-attention is an attention mechanism relating different positions of a single sequence or signal in order to compute a representation of the same sequence or signal. Attention mechanisms define "important" portions of one or more sequences or signals relative to other portions of the sequence(s) or signal(s). In the context of a multichannel representation of the plurality of channels, self-attention defines the plurality of channels in terms of channels or portions of channels that are more important for speech processing and portions that are less important for speech processing. For example, the weighted multichannel representation indicate which portions of a signals across a plurality of channels are important for speech processing and which portions of the signals not to focus on. In this manner, the various modified speech signals received by the channel combining system (e.g., channel combining system 214) are processed at the front end into a single channel representation (e.g., combined signal 216) that emphasizes the portions of the plurality of modified signals (e.g., modified signals 204, 206, 208, 210, 212 and speech signal 200) that are most important for speech processing.

In some implementations, combining 120 the plurality of modified signals, thus defining a combined signal includes extracting 126 feature information from each modified signal; and combining 128 the feature information from the plurality of modified signals. For example, single channel speech enhancement process 10 combines the plurality of modified signals by concatenating features extracted from each channel. In one example, single channel speech enhancement process 10 extracts features (i.e., acoustic signal features such as Mel Filter bank coefficients/Mel-Frequency Cepstral Coefficients (MFCCs) or neural auto encoder-based representations such as "problem-agnostic speech encoder" (PASE) representations) from each modified speech signal (e.g., modified speech signals 204, 206, 208, 510, 212 and original speech signal 200). A Filter Bank is an arrangement of bandpass filters that split an input signal into a set of analysis signals, each one carrying a single frequency sub-band of the original signal. In particular, a Mel Filter bank is a triangular filter bank that works similar to the human ears perception of sound which is more discriminative at lower frequencies and less discriminative at higher frequencies. The Mel Filter bank is used to generate MFCCs or coefficients that collectively make up a representation of the short-term power spectrum of a sound, based on a linear cosine transform of a log power spectrum on a nonlinear Mel scale of frequency. PASE, as described in the article "Learning Problem-agnostic Speech Representations from Multiple Self-supervised Tasks", uses a convolutional encoder to learn features from raw waveforms and train it by using these features simultaneously for a variety of self-supervised tasks like reconstruction of waveform in an autoencoder fashion, predicting the Log power spectrum, Language Agnostic Speech Embeddings for Emotion Classification MFCC and prosodic features from raw waveforms. The encoder trains to extract representations that work jointly for all those tasks.

In some implementations, with the extracted features, single channel speech enhancement process 10 concatenates a plurality of features or feature streams from the plurality of modified speech signals (e.g., modified speech signals 204, 206, 208, 210, 212) and/or the original speech signal (e.g., speech signal 200). For example, suppose that single channel speech enhancement process 10 generates e.g., seven channels (e.g., one being the original signal, and six versions representing some speech enhancement processing). Single channel speech enhancement process 10 concatenates, as an example, 14 coefficients from the original speech signal and 11 coefficients each from the six modified speech signals, resulting in an 80-dimension feature vector per time frame (e.g., combined speech signal 216).

In some implementations, performing 104 speech processing on the plurality of modified signals includes providing 130 the plurality of modified signals to a multi-channel speech processing system. A multi-channel speech processing system is a speech processing system configured to process multiple channels by weighting particular portions of the multiple channels to produce an enhanced representation in noisy conditions with reverberation and echoes. As discussed above, conventional approaches to using multi-channel speech processing systems are unable to work effectively with just a single channel. However, by utilizing the plurality of modified signals, multi-channel speech processing systems are used in environments where only a single microphone channel is available. Referring also to FIG. 3, single channel speech enhancement process 10 provides 130 the plurality of modified signals (e.g., modified signals 204, 206, 208, 210, 212) and the original speech signal (e.g., speech signal 200) to a multi-channel speech processing system (e.g., speech processing system 300). In this example, multi-channel speech processing system 300 generates a transcription (e.g., transcription 220) of the plurality of modified speech signals (e.g., modified signals 204, 206, 208, 210, 212) and/or populates medical records or other records using the content of the modified speech signals and the original speech signal.

In some implementations, performing 104 speech processing on the plurality of modified signals results in improvements in speech processing compared to conventional approaches. For example, in one implementation, three systems are compared: 1) a speech processing system with a single channel microphone signal; 2) a speech processing system with an enhanced version of the single channel microphone signal; and 3) an embodiment of the above described channel processors and channel combining system with the single channel microphone signal and a plurality of modified speech signals. In a comparison of the three systems, a word error rate reduction (WERR) of 6% is realized by the embodiment of the above described channel processors and channel combining system compared to the speech processing system with a single channel microphone signal; and a WERR of 3% is realized compared to a speech processing system with an enhanced version of the single channel microphone signal. Accordingly, implementations of the present disclosure provides an improvement in the technical field of speech processing compared to conventional single channel speech processing systems.

Figure 4:
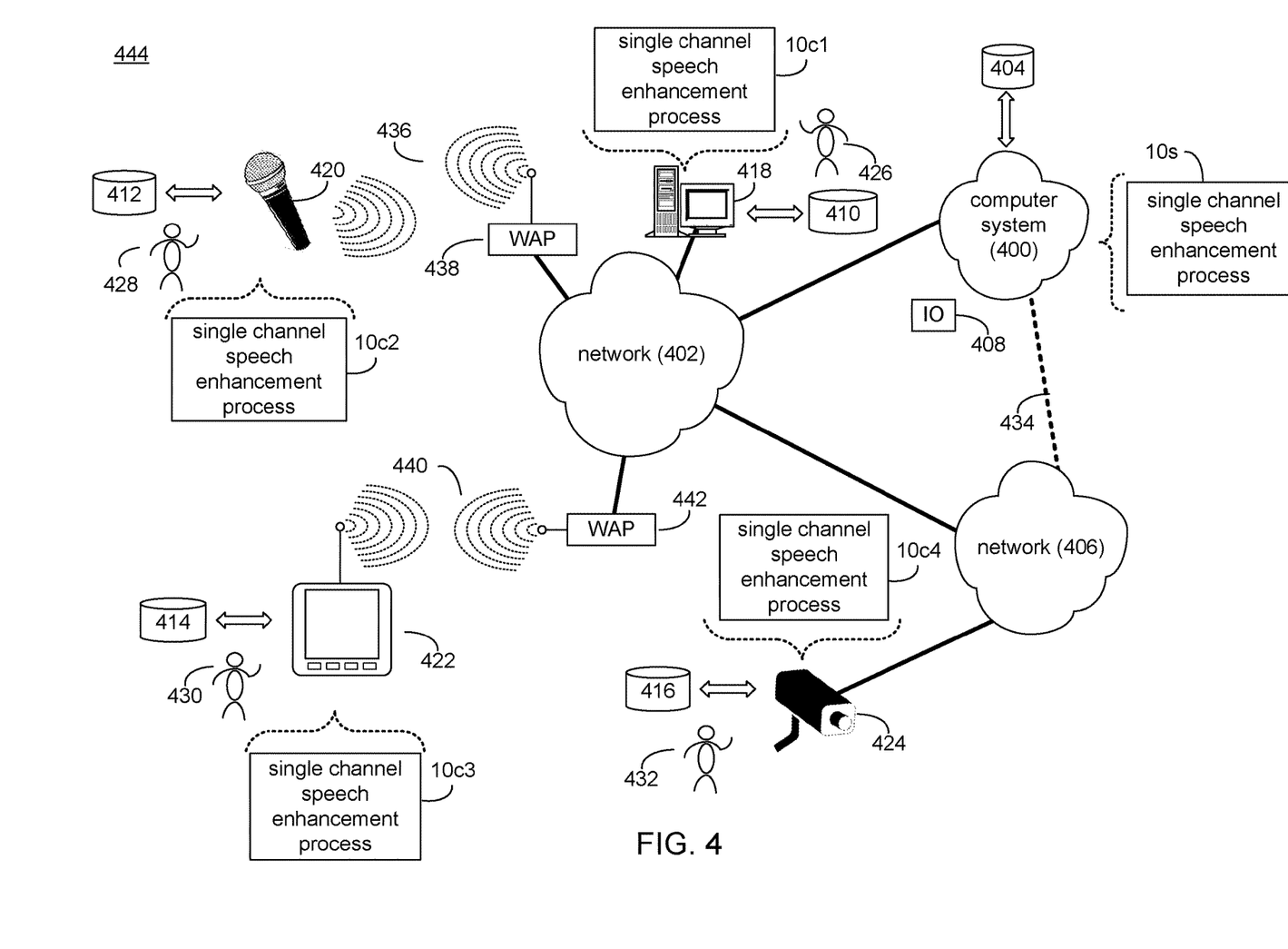
FIG. 4 is a diagrammatic view of computer system and a single channel speech enhancement process coupled to a distributed computing network.

System Overview:

Referring to FIG. 8, there is shown single channel speech enhancement process 10. Single channel speech enhancement process 10 may be implemented as a server-side process, a client-side process, or a hybrid server-side/client-side process. For example, single channel speech enhancement process 10 may be implemented as a purely server-side process via single channel speech enhancement process 10s. Alternatively, single channel speech enhancement process 10 may be implemented as a purely client-side process via one or more of single channel speech enhancement process 10c1, single channel speech enhancement process 10c2, single channel speech enhancement process 10c3, and single channel speech enhancement process 10c4. Alternatively still, single channel speech enhancement process 10 may be implemented as a hybrid server-side/client-side process via single channel speech enhancement process 10s in combination with one or more of single channel speech enhancement process 10c1, single channel speech enhancement process 10c2, single channel speech enhancement process 10c3, and single channel speech enhancement process 10c4.

Accordingly, single channel speech enhancement process 10 as used in this disclosure may include any combination of single channel speech enhancement process 10s, single channel speech enhancement process 10c1, single channel speech enhancement process 10c2, single channel speech enhancement process 10c3, and single channel speech enhancement process 10c4.

Single channel speech enhancement process 10s may be a server application and may reside on and may be executed by a computer system 400, which may be connected to network 402 (e.g., the Internet or a local area network). Computer system 400 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 400 may execute one or more operating systems.

The instruction sets and subroutines of single channel speech enhancement process 10s, which may be stored on storage device 404 coupled to computer system 400, may be executed by one or more processors (not shown) and one or more memory architectures (not shown) included within computer system 400. Examples of storage device 404 may include but are not limited to: a hard disk drive; a RAID device; a random access memory (RAM); a read-only memory (ROM); and all forms of flash memory storage devices.

Network 402 may be connected to one or more secondary networks (e.g., network 404), examples of which may include but are not limited to: a local area network; a wide area network; or an intranet, for example.

Various IO requests (e.g., IO request 408) may be sent from single channel speech enhancement process 10s, single channel speech enhancement process 10c1, single channel speech enhancement process 10c2, single channel speech enhancement process 10c3 and/or single channel speech enhancement process 10c4 to computer system 400. Examples of IO request 408 may include but are not limited to data write requests (i.e., a request that content be written to computer system 400) and data read requests (i.e., a request that content be read from computer system 400).

The instruction sets and subroutines of single channel speech enhancement process 10c1, single channel speech enhancement process 10c2, single channel speech enhancement process 10c3 and/or single channel speech enhancement process 10c4, which may be stored on storage devices 410, 412, 414, 416 (respectively) coupled to client electronic devices 418, 420, 422, 424 (respectively), may be executed by one or more processors (not shown) and one or more memory architectures (not shown) incorporated into client electronic devices 418, 420, 422, 424 (respectively). Storage devices 410, 412, 414, 416 may include but are not limited to: hard disk drives; optical drives; RAID devices; random access memories (RAM); read-only memories (ROM), and all forms of flash memory storage devices. Examples of client electronic devices 418, 420, 422, 424 may include, but are not limited to, personal computing device 418 (e.g., a smart phone, a personal digital assistant, a laptop computer, a notebook computer, and a desktop computer), audio input device 420 (e.g., a handheld microphone, a lapel microphone, an embedded microphone (such as those embedded within eyeglasses, smart phones, tablet computers and/or watches) and an audio recording device), display device 422 (e.g., a tablet computer, a computer monitor, and a smart television), machine vision input device 424 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 426, 428, 430, 432 may access computer system 400 directly through network 402 or through secondary network 406. Further, computer system 400 may be connected to network 402 through secondary network 406, as illustrated with link line 434.

The various client electronic devices (e.g., client electronic devices 418, 420, 422, 424) may be directly or indirectly coupled to network 402 (or network 406). For example, personal computing device 418 is shown directly coupled to network 402 via a hardwired network connection. Further, machine vision input device 424 is shown directly coupled to network 406 via a hardwired network connection. Audio input device 422 is shown wirelessly coupled to network 402 via wireless communication channel 436 established between audio input device 420 and wireless access point (i.e., WAP) 438, which is shown directly coupled to network 402. WAP 438 may be, for example, an IEEE 402.11a, 402.11b, 402.11g, 402.11n, Wi-Fi™, and/or Bluetooth™ device that is capable of establishing wireless communication channel 436 between audio input device 420 and WAP 438. Display device 422 is shown wirelessly coupled to network 402 via wireless communication channel 440 established between display device 422 and WAP 442, which is shown directly coupled to network 402.

The various client electronic devices (e.g., client electronic devices 418, 420, 422, 424) may each execute an operating system, wherein the combination of the various client electronic devices (e.g., client electronic devices 418, 420, 422, 424) and computer system 400 may form modular system 444.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a signal from a single microphone;
   generating a plurality of modified signals from the signal received from the single microphone, wherein the plurality of modified signals include at least a first acoustic parameter-specific signal and a second acoustic parameter-specific signal, the first acoustic parameter-specific signal having a higher C50 value than the second acoustic parameter-specific signal;
   weighting each of the plurality of modified signals, wherein the first acoustic parameter-specific signal is assigned a higher weight than the second acoustic parameter-specific signal based on the first acoustic parameter-specific signal having a higher C50 value than the second acoustic parameter-specific signal;
   generating a combined modified signal by combining the plurality of modified signals based upon, at least in part, the weighting of each of the plurality of modified signals; and
   performing speech recognition on the combined modified signal.

2. The computer-implemented method of claim 1, wherein the plurality of modified signals includes a plurality of speaker-specific signals associated with a plurality of speakers.

3. The computer-implemented method of claim 2, wherein generating the plurality of speaker-specific signals associated with the plurality of speakers includes constructing a mask for each speaker in the plurality of speakers to attenuate speech associated with other speakers in the plurality of speakers, thus defining a plurality of speaker masks.

4. The computer-implemented method of claim 3, wherein constructing the mask for each speaker in the plurality of speakers includes constructing a quantized mask with an attenuation factor based upon, at least in part, a speaker identification confidence value.

5. The computer-implemented method of claim 1, wherein generating the plurality of modified signals includes performing a plurality of speech enhancements on the signal received from the single microphone.

6. The computer-implemented method of claim 1, wherein combining the plurality of modified signals includes:
   extracting feature information from each modified signal in the plurality of modified signals; and
   combining the extracted feature information.

7. The computer-implemented method of claim 1, wherein performing speech recognition on the combined modified signal includes:
   performing speech recognition on the combined modified signal using a multi-channel speech processing system.

8. A computing system comprising:
   a memory storing programming instructions; and
   a processor configured to execute the programming instructions stored by the memory, wherein the programming instructions, upon execution by the processor, cause the computing system to:
   receive a signal from a single microphone;
   generate a plurality of modified signals from the signal received from the single microphone, wherein the plurality of modifies signals include at least a first acoustic parameter-specific signal and a second acoustic parameter-specific signal, the first acoustic parameter-specific signal having a higher C50 value than the second acoustic parameter-specific signal;

weight each of the plurality of modified signals, wherein the first acoustic parameter-specific signal is assigned a higher weight than the second acoustic parameter-specific signal based on the first acoustic parameter-specific signal having a higher C50 value than the second acoustic parameter-specific signal;

generate a combined modified signal by combining the plurality of modified signals based upon, at least in part, the weighting of each of the plurality of modified signals; and perform speech recognition on the combined modified signal.

9. The computing system of claim 8, wherein the plurality of modified signals includes a plurality of speaker-specific signals associated with a plurality of speakers.

10. The computing system of claim 9, wherein generating the plurality of speaker-specific signals associated with the plurality of speakers includes constructing a mask for each speaker in the plurality of speakers to attenuate speech associated with other speakers in the plurality of speakers, thus defining a plurality of speaker masks.

11. The computing system of claim 10, wherein constructing the mask for each speaker in the plurality of speakers includes constructing a quantized mask with an attenuation factor based upon, at least in part, a speaker identification confidence value.

12. A computer program product comprising a non-transitory computer readable medium having a plurality of instructions stored thereon which, when executed by a processor, cause the processor to perform operations comprising:

receiving a signal from a single microphone;

generating a plurality of modified signals from the signal received from the single microphone, wherein the plurality of modifies signals include at least a first acoustic parameter-specific signal and a second acoustic parameter-specific signal, the first acoustic parameter-specific signal having a higher C50 value than the second acoustic parameter-specific signal;

weighting each of the plurality of modified signals, wherein the first acoustic parameter-specific signal is assigned a higher weight than the second acoustic parameter-specific signal based on the first acoustic parameter-specific signal having a higher C50 value than the second acoustic parameter-specific signal; and generating a combined modifies signal by combining the plurality of modified signals based upon, at least in part, the weighting of each of the plurality of modified signals and performing speech recognition on the combined modifies signal.

13. The computer program product of claim 12, wherein the plurality of modified signals includes a plurality of speaker-specific signals associated with a plurality of speakers, and wherein generating the plurality of speaker-specific signals associated with the plurality of speakers includes constructing a mask for each speaker to attenuate speech associated with other speakers, thus defining a plurality of speaker masks.

14. The method of claim 1, wherein a C50 value of the first acoustic parameter-specific signal is a ratio between sound energy received within the first fifty (50) milliseconds (ms) of a room impulse response (RIR) corresponding to the first acoustic parameter-specific signal and sound energy received after the first 50 ms of the RIR corresponding to the first acoustic parameter-specific signal.

15. The method of claim 1, wherein the plurality of modified signals include at least two acoustic parameter-specific signals associated with different segmental signal to noise ratios (SNRs), and wherein the at least two acoustic parameter-specific signals are assigned different weights based on the different segmental SNRs associated with the at least two acoustic parameter-specific signals.

16. The method of claim 1, wherein the plurality of modified signals include at least two acoustic parameter-specific signals having different reverberation parameters, and wherein the at least two acoustic parameter-specific signals are assigned different weights based on the different reverberation parameters associated with the at least two acoustic parameter-specific signals.

17. The method of claim 16, wherein the reverberation parameters associated with the at least two acoustic parameter-specific signals include reverberation times of the at least two acoustic parameter-specific signals.

18. The method of claim 17, wherein the reverberation times of the at least two acoustic parameter-specific signals correspond to a length of time required for a sound intensity of the at least two acoustic parameter-specific signals to fall below a threshold.

19. The method of claim 1, wherein speech recognition is performed on the combined modified signal using a multi-channel speech processing system.

* * * * *